(12) United States Patent  
Wang et al.

(10) Patent No.: US 8,576,451 B2  
(45) Date of Patent: Nov. 5, 2013

(54) VERSATILE MOIRÉ-FREE HALFTONE GEOMETRY THAT USES FREQUENCY VECTOR SHEARING

(75) Inventors: Shen-Ge Wang, Fairport, NY (US); Zhigang Fan, Webster, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 317 days.

(21) Appl. No.: 13/178,962

(22) Filed: Jul. 8, 2011

(65) Prior Publication Data

US 2013/0010336 A1  Jan. 10, 2013

(51) Int. Cl.
*H04N 1/405* (2006.01)
*G03G 15/01* (2006.01)
*G03G 13/04* (2006.01)
*G09G 5/02* (2006.01)

(52) U.S. Cl.
USPC ......... 358/3.06; 358/1.9; 358/1.15; 358/3.03; 358/3.2; 399/180; 345/596; 347/131

(58) Field of Classification Search
None
See application file for complete search history.

(56) References Cited

U.S. PATENT DOCUMENTS

| 5,323,245 A | 6/1994 | Rylander |
| 5,371,612 A | 12/1994 | Sakamoto |
| 5,583,660 A | 12/1996 | Rylander |
| 6,798,539 B1 | 9/2004 | Wang et al. |
| 6,985,256 B2 * | 1/2006 | Cheng et al. .................. 358/1.9 |
| 7,480,076 B2 * | 1/2009 | Wang .............................. 358/1.9 |
| 7,675,651 B2 * | 3/2010 | Wang et al. ................. 358/3.06 |
| 7,679,787 B2 * | 3/2010 | Wang et al. ................. 358/3.06 |
| 7,898,692 B2 | 3/2011 | Wang et al. |
| 8,467,102 B2 * | 6/2013 | Sano et al. .................. 358/3.13 |
| 2008/0130054 A1 | 6/2008 | Wang |
| 2008/0130056 A1 | 6/2008 | Wang |

OTHER PUBLICATIONS

Wang, et al. "Non-Orthogonal Halftone Screens," Proc. NIP18: International Conference on Digital Printing Technologies, pp. 578-584, 2002.
Ulichney, "Digital Halftoning," The MIT Press, pp. 117-126, 1988.
Turbek, et al. "Comparison of Hexagonal and Square Dot Centers for EP Halftones," PICS 2000, pp. 321-325.

* cited by examiner

*Primary Examiner* — Steven Kau
(74) *Attorney, Agent, or Firm* — Fay Sharpe LLP

(57) ABSTRACT

As set forth herein, computer-implemented methods and systems facilitate the generation of halftone screens for moiré-free color halftoning. A first fundamental frequency vector and a second fundamental frequency vector of a halftone cell are sheared using a selected shearing value. The shearing value is selected as an offset in a fast scanning or slow scanning direction. The selected shearing value satisfies various moiré-free conditions associated with the identified frequency vectors and is capable of being selected for multiple halftone screens. The halftone screens generated using the sheared frequency vectors are used for moiré-free halftoning.

20 Claims, 11 Drawing Sheets

VERSATILE MOIRÉ-FREE HALFTONE GEOMETRY THAT USES FREQUENCY VECTOR SHEARING

CROSS REFERENCE TO RELATED PATENTS AND APPLICATIONS

U.S. Patent Application No. 2008/0130056, filed Jun. 5, 2008, entitled "Rosette Printing With Up To 5 Colors" by Wang the disclosure of which is incorporated herein by reference in its entirety.

U.S. Patent Application No. 2008/0130054, filed Jun. 5, 2008, entitled "N-Color Printing With Hexagonal Rosettes" to Wang, the disclosure of which is incorporated herein by reference in its entirety.

TECHNICAL FIELD

The presently disclosed embodiments are directed toward methods and systems for printing, reproducing or displaying images. More particularly, the teachings disclosed herein are applicable to methods and apparatuses wherein moiré-free halftone geometries are implemented.

BACKGROUND

With the advent of inexpensive digital color printers, methods and systems of color digital halftoning have become increasingly important in the reproduction of printed or displayed images possessing continuous color tones. It is well understood that most digital color printers operate in a binary mode, i.e. for each color separation, a corresponding color spot is either printed or not printed at a specified location or pixel. Digital halftoning controls the printing of color spots, where the spatial averaging of the printed color spots by either a human visual system or a viewing instrument, provide the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel, if the required color tone level is darker than the given halftone threshold level, a color spot is printed at that specified pixel. Otherwise the color spot is not printed. The output of the screening process is a binary pattern of multiple small "dots," which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated by those skilled in the art that idealized halftone dots can possess a variety of shapes that include rectangles, squares, lines, circles, ellipses, "plus signs," X-shapes, pinwheels, and pincushions, and actual printed dots can possess distortions and fragmentation of those idealized shapes introduced by digitization and the physical printing process. Various digital halftone screens having different shapes and angles are described in U.S. Pat. No. 4,149,194, the disclosure of which is incorporated herein by reference in its entirety.

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies and harmonics of the individual color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. To avoid, for example, two-color moiré patterns due to misalignment, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color separations, it is desirable to avoid any two-color moiré as well as any three-color moiré. It will be appreciated that in the traditional printing industry that three halftone screens, which can be constructed by halftone cells that are square in shape and identical, can be placed at 15°, 45°, and 75°, respectively, from a point and axis of origin, to provide the classical three-color moiré-free solution.

However, for digital halftoning, the freedom to rotate a halftone screen is limited by the raster structure, which defines the position of each pixel. Since) tan(15° and)tan(75° are irrational numbers, rotating a halftone screen to 15° or 75° cannot be exactly implemented in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

Customers who use clustered dot halftoning such as laser printing or offset printing may use halftone geometries. However, existing halftone geometries are constrained, capable of providing only limited options with respect to halftone angle and frequency. Given such constraints, it is difficult to satisfy multiple system requirements, e.g. a requirement that halftones be moiré-free, not beat with multiple frequency components from the raster output system, screen visibility, and be free of halftone artifacts. It is also desirable to avoid the use of 0° screens, which give rise to multiple image processing issues. Many attempts have been made to solve these issues, however none have produced a complete solution.

U.S. Pat. No. 7,898,692 to Wang and voce, entitled "Rosette Printing with up to Five Colors" produces moiré-free color halftone printing with up to five color image separations. It also uses a plurality of non-orthogonal halftone screens, defines a first and second color halftone screen fundamental frequency vector for each of three halftone screens which produces moiré-free rosettes, and defines a fourth color halftone with the first fundamental vector of the fourth screen shares a fundamental frequency vector with one of said three halftone screens and a second fundamental frequency vector of the fourth screen shares a fundamental frequency vector with a different one of said three color halftone screens. Further, it defines a fifth color halftone screen where a first fundamental vector of the fifth screen shares a fundamental frequency vector with one of the three halftone screens and a second fundamental frequency vector of the fifth screen shares a fundamental frequency vector with a different one of the three color halftone screens. None of the fundamental frequency vectors of the fifth screen are equal to either of the fundamental frequency vectors of the fourth screen. The disclosure of U.S. Pat. No. 7,898,692 is hereby incorporated by reference in its entirety.

U.S. Pat. No. 7,675,651 to Wang and Lace, entitled "Moiré-free color halftone configuration employing common frequency vectors", produces moiré-free color halftone printing of up to four color image separations by using a plurality of non-orthogonal halftone screens to produce moiré-free prints that form uniform periodic rosettes. It uses a first and second color halftone screen fundamental frequency vector designed for each of three halftone screens such that the halftone screen set output forms uniform hexagonal rosettes. It also defines a fourth color halftone screen where a first fundamental vector of the fourth screen shares a fundamental frequency vector with one of the three halftone screens. It also defines a second fundamental frequency vector of the fourth screen that shares a fundamental frequency vector with a different one of said three color halftone screens. The disclosure of U.S. Pat. No. 7,675,651 is hereby incorporated by reference in its entirety.

U.S. Pat. No. 7,480,076, to Wang, entitled "Moiré-Free Color Halftone Configuration", is directed to moiré-free color halftone configurations for clustered dots. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré-free, as all the fundamentals and harmonic frequencies are multiples of, and thus higher in frequency than, the rosette fundamental frequency. The disclosure of U.S. Pat. No. 7,480,076 is hereby incorporated by reference in its entirety.

U.S. Pat. No. 6,798,539 to Wang, Fan, and Wen, entitled "Method for Moiré-Free Color Halftoning Using Non-Orthogonal Cluster Screens", is directed to the use of single-celled, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations. The disclosure of U.S. Pat. No. 6,798,539 is hereby incorporated by reference in its entirety.

U.S. Pat. No. 7,679,787 to Wang and Lace, entitled "N-Color Printing with Hexagonal Rosettes", produces moiré-free enhanced color halftone printing of color image separations for an arbitrary number of colorants. It uses a plurality of halftone screens to produce outputs that are moiré free and form hexagonal periodic rosettes. A large number of screens can be used for enhanced printing applications, such as printing with high-fidelity colorants, light colorants, or special colorants, such as white, metallics and fluorescents. It defines rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1} \pm V_{R2}|>f_{min}$. It also defines N halftone screens for colorants i=1, N, respectively possessing first and second frequency vectors ($V_{i1}$, $V_{i2}$), where no two screens possess identical fundamental frequency vector pairs. It then selects fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and "$|V_{ik}|>2$ max $[|V_{R1}|, |V_{R2}|]$. The disclosure of U.S. Pat. No. 7,679,787 is hereby incorporated by reference in its entirety. What is needed in the art is a versatile adjustment of a moiré free halftone set such as that angles and frequencies may be optimized for a given imaging printing system.

Incorporation By Reference

S. Wang, Z. Fan and Z. Wen, "Non-Orthogonal Halftone Screens," Proc. NIP18: International Conference on Digital Printing Technologies, pages 578-584, 2002.

R. Ulichney, "Digital Halftoning," The MIT Press, pages 117-126, 1988.

M. Turbek, S. Weed, T. Cholewo, B. Damon, M. Lhamon, "Comparison of Hexagonal and Square Dot Centers for EP Halftones," PICS 2000, pages 321-325.

BRIEF DESCRIPTION

In some illustrative embodiments disclosed as illustrative examples herein, a computer-implemented method for generating halftone screens for moiré-free color halftoning, comprises identifying a first color halftone screen having halftone cells defined by a first fundamental frequency vector ($V_1$) and a second fundamental frequency vector ($V_2$), and selecting at least one shearing value (s) representative of an offset in at least one of a fast scan direction and a slow scan direction. The method further comprises shearing at least one of the first fundamental frequency vector ($V_1$) and the second fundamental frequency vector ($V_2$) for the first halftone screen by application of the shearing value (s) associated therewith, and generating a first sheared color halftone screen in accordance with at least one of the sheared first fundamental frequency vector ($V_1$) and the second fundamental frequency vector ($V_2$) so as to avoid moiré image effects.

In some illustrative embodiments disclosed as illustrative examples herein, a computer-implemented method for generating a set of sheared color halftone screens for moiré-free color halftoning, comprises identifying a first color halftone screen having halftone cells defined by a first fundamental frequency vector ($V_{c1}$) and a second fundamental frequency vector ($V_{c2}$), a second color halftone screen defined by a first fundamental frequency vector ($V_{m1}$) and a second fundamental frequency vector ($V_{m2}$), and a third color halftone screen defined by a first fundamental vector ($V_{k1}$) and a second fundamental frequency vector ($V_{k2}$). The method also comprises selecting a shearing value ($s_c$, $s_m$, $s_k$) corresponding to an offset in at least one of a fast scan direction and a slow scan direction for each of the first, second, and third color halftone screens, and shearing at least one of the first fundamental frequency vectors ($V_{c1}, V_{m1}, V_{k1}$) and the second fundamental frequency vectors ($V_{c2}, V_{m2}, V_{k2}$) for each of the first, second, and third halftone screens by application of the shearing values ($s_c, s_m, s_k$) corresponding thereto. The method further comprises generating a set of sheared color halftone screens in accordance with at least one of the sheared first fundamental frequency vectors ($V_{c1}, V_{m1}, V_{k1}$) and the second fundamental frequency vectors ($V_{c2}, V_{m2}, V_{k2}$) so as to avoid moiré image effects, and outputting the set of sheared color halftone screens.

In some illustrative embodiments disclosed as illustrative examples herein, a system that facilitates generating halftone screens for moiré-free color halftoning comprises a processor. The processor is operable to identify a first color halftone screen having halftone cells defined by a first fundamental frequency vector ($V_1$) and a second fundamental frequency vector ($V_2$), and to select at least one shearing value (s) representative of an offset in at least one of a fast scan direction and a slow scan direction. The processor is further operable to shear at least one of the first fundamental frequency vector ($V_1$) and the second fundamental frequency vector ($V_2$) for the first halftone screen by application of the shearing value (s) associated therewith, and to generate a first sheared color halftone screen in accordance with at least one of the sheared first fundamental frequency vector ($V_1$) and the second fundamental frequency vector ($V_2$) so as to avoid moiré image effects. The system further comprises a printer that prints a halftone image using the first sheared color halftone screen.

DETAILED DESCRIPTION

The present disclosure and embodiments described herein provide halftoning methods and halftoning configurations using modified color halftone screens, or more precisely, sheared color halftone screens for moiré-free color printing.

The subject application presents a moiré-free halftone geometry which uses shearing of the frequency vectors in the fast scanning and/or slow scanning direction. One embodiment that may achieve such shearing is to apply a line-to-line offset in the start-of-scan signal for the raster line. Current vertical-cavity surface-emitting laser raster output scanner electronics use a 4-phase clock to enable a 9600 spi resolution (4×2400 spi) for start-of-scan. It will be understood by those skilled in the art that while such a resolution is currently sufficient for certain embodiments of the subject application, other, higher resolutions may be needed for future electronics, so as to provide an analog tuning of the shear of a screen or screen set. In addition to the enabling of new geometries via shearing, as explained in greater detail below, the shearing parameter, or offset, may be used so as to adjust given halftone sets to have shear that may be preferred for particular images, e.g. tinted text, tinted italic text, and angled graphics.

Figure 1:
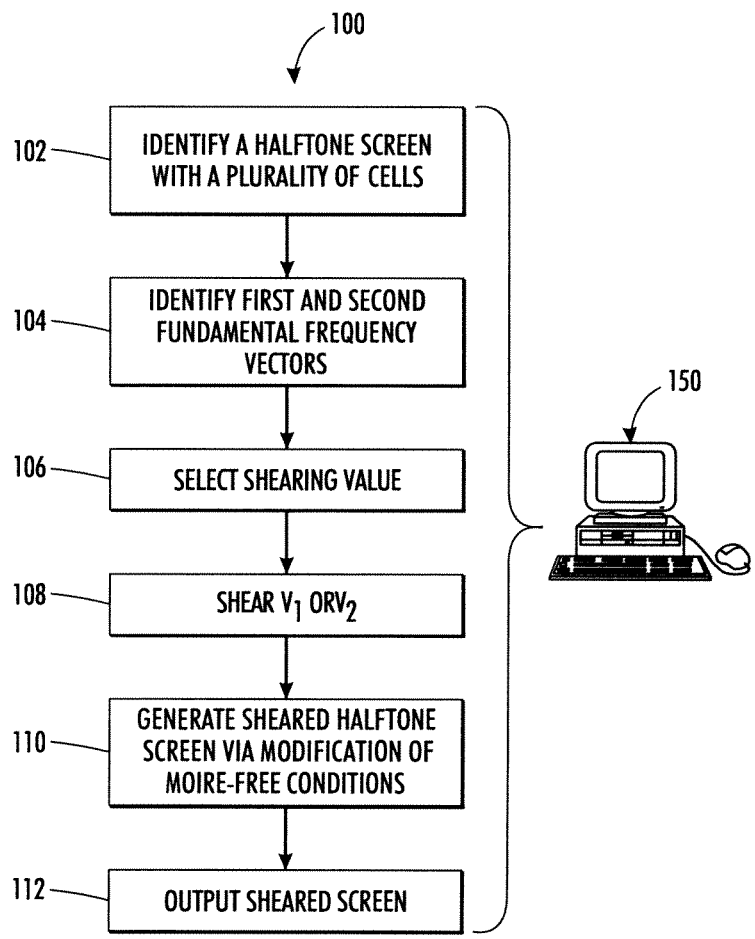
FIG. 1 illustrates a method of generating halftone screens for moiré-free color halftoning using frequency vector shearing in accordance with one embodiment of the subject application.

Turning now to FIG. 1, there is shown a method 100 of generating halftone screens for moiré-free color halftoning using frequency vector shearing, in accordance with the example embodiments described herein. At step 102, a halftone screen is identified comprising a plurality of halftone cells. The skilled artisan will appreciate that the color halftoning operations employ multiple color screens to achieve the desired appearance of a particular color to the viewer. Accordingly, the methodology 100 of FIG. 1 identifies one of these color halftone screens, Cyan, Magenta, Yellow, blacK, commonly referenced as CMYK. Those skilled in the art will appreciate that other colorants are also capable of being employed and adapted in accordance with the subject application.

In accordance with one example embodiment of the subject application, the halftone screen identified at step 102 may correspond to a first screen from a particular set of halftone screens which a user desires to use, e.g. the set provides desirable flesh tone reproduction, landscape photographic reproduction, provides clear italic typeset, textured fabric photographic reproduction, or the like. However, past experience or attempted usage indicates that such a set of screens in the particular application, i.e. photograph, magazine printing, italics, or the like, results in beating, interference with the subject matter, or moiré patterns appearing in the output results.

It will be appreciated by those skilled in the art that the methodology 100 illustrated in FIG. 1 is capable of being implemented by a computer system 150, which comprises at least a processor (such as the processor 1102 of FIG. 11) that executes, and a memory (such as the memory 1104 of FIG. 11) that stores, computer-executable instructions for providing the various functions, calculations, selections, and the like, described herein.

In accordance with one embodiment of the subject application, the computer system 150 is capable of being employed as one possible hardware configuration to support the systems and methods described herein. The skilled artisan will further appreciate that although illustrated as a standalone device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application.

The computer 150 can include a processing unit (see, e.g. FIG. 11), a system memory (see, e.g. FIG. 11), and a system bus (such as the bus 1112 of FIG. 11) that couples various system components including the system memory to the processing unit. The processing unit can be any of various commercially available processors. Dual microprocessors and other multi-processor architectures also can be used as the processing unit.

The computer 150 typically includes at least some form of computer readable media. Computer readable media can be any available media that can be accessed by the computer. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11 (x), a proprietary communications channel, infrared, optical, the public switched telephone network, or any suitable wireless data transmission system, or wired communications known in the art. Combinations of any of the above can also be included within the scope of computer readable media.

A user may enter commands and information into the computer through an input device (see, e.g. FIG. 11) such as a keyboard, a pointing device, such as a mouse, stylus, voice input, or graphical tablet. The computer 150 is capable of operating in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet. Additional functioning of the computer 150 with respect to the example computer system 1100 of FIG. 11, discussed in greater detail below.

Figure 2:
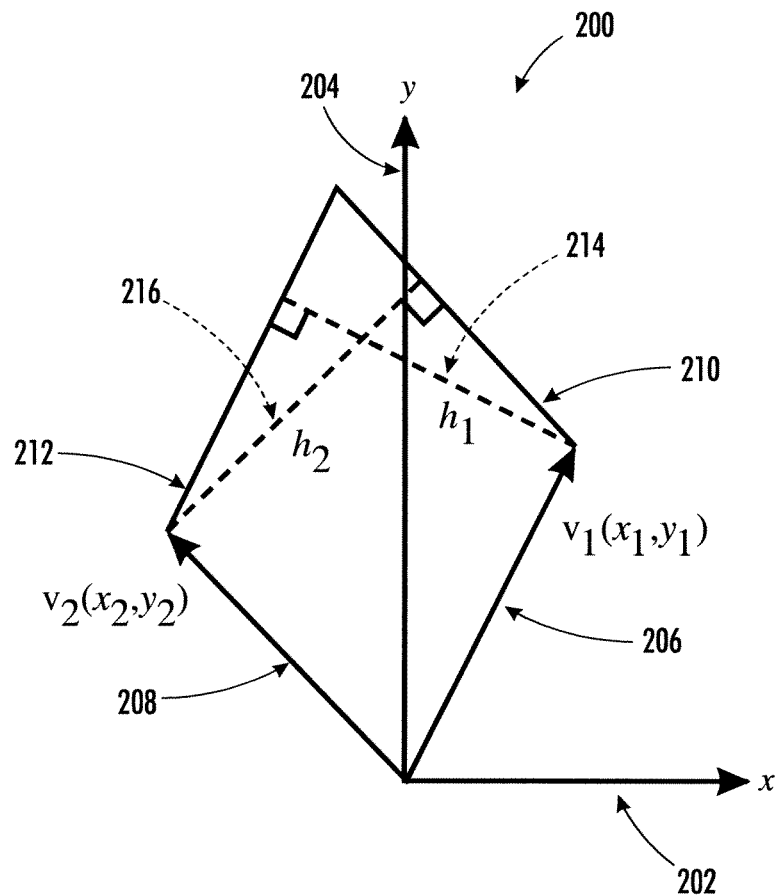
FIG. 2 illustrates spatial vectors defining a nonorthogonal halftone cell in accordance with one embodiment of the subject application.

Returning to step 102, an example non-orthogonal halftone cell of the identified halftone screen is illustrated in FIG. 2. As shown in FIG. 2, a general non-orthogonal halftone cell 200 is defined in the spatial domain. It will be understood by those skilled in the art that the cell 200 is depicted as a parallelogram for example purposes only, and the subject application is capable of implementation on a variety of halftone cell shapes.

The general non-orthogonal halftone cell 200 is plotted on a horizontal axis 202, and a vertical axis 204, enabling a general nonorthogonal halftone screen to be specified by two vectors, $v_1(x_1, y_1)$ 206 and $v_2(x_2, y_2)$ 208. Each vector has a perpendicular such that $v_1$ 206 has a perpendicular $h_1$ 214 and a parallel line 210, while $v_2$ 208 has a perpendicular $h_2$ 216 and a parallel 212.

Figure 3:
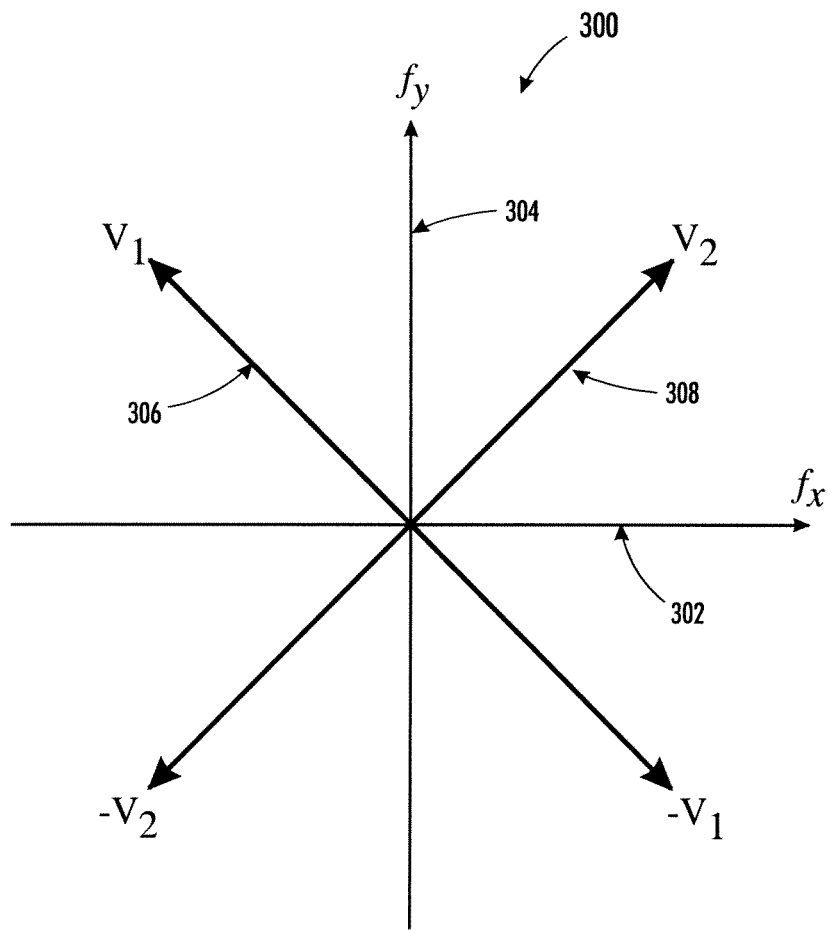
FIG. 3 illustrates two corresponding fundamental frequencies of the Fourier transform function in accordance with one embodiment of the subject application.

It will be appreciated by those skilled in the art that by using Fourier transforms, it is possible to represent the spatial vectors 206 and 208 in the frequency domain. Therefore, at step 104, a first fundamental frequency vector ($V_1$) and a second fundamental frequency vector ($V_2$) are identified that define the halftone cell comprising the halftone screen. Accordingly, FIG. 3 illustrates such a frequency domain 300 representation of the spatial vectors 206 and 208. Thus, the skilled artisan will appreciate that the screen can be represented by two frequency vectors, $V_1(f_{x1}, f_{y1})$ 306 and $V_2(f_{x2}, f_{y2})$ 308, plotted along the $f_x$-axis 302 and $f_y$-axis 304. Similar to an orthogonal case, $V_1$ 306 and $V_2$ 308 are perpendicular to $v_1$ 206 and $v_2$ 208, respectively. However, the moduli of the frequency vectors $|V_1|$ 306 and $|V_2|$ 308 are not given by the reciprocals of $|v_2|$ 206 and $|v_1|$ 208, as for the orthogonal screens. Instead, $|V_1|$ 306 and $|V_2|$ 308 are equal to the reciprocals of $h_1$ 214 and $h_2$ 216, which are the heights, or the pitches shown by dot lines 406 of FIG. 4, as discussed in greater detail below. Since the product, $|v_1|*h_1 = |v_2|*h_2 = A$, is the area of the specified parallelogram bounded by the sides 206, 208, 210, 212, the moduli of the frequency vectors $V_1$ 306 and $V_2$ 308 may be given by:

$$|V_1| = \frac{|v_1|}{A}, \tag{1a}$$

$$|V_2| = \frac{|v_2|}{A}, \tag{1b}$$

where A is given by the absolute value of the cross product of the two spatial domain vectors 206 and 208, $v_1 \times v_2$. Therefore, A may be expressed as a function of the spatial coordinates $x_1, y_1, x_2$, and $y_2$, by:

$$A = |x_1 y_2 - x_2 y_1|. \tag{2}$$

Since the spatial vector $v_1(x_1, y_1)$ and the frequency vector $V_1(f_{x1}, f_{y1})$ are perpendicular to each other, and that $v_2(x_2, y_2)$ and $V_2(f_{x2}, f_{y2})$ are perpendicular, from Eqs. (1a) and (1b), the frequency vectors $V_1$ and $V_2$ may be decomposed into their scalar components as:

$$f_{x1} = \frac{-y_1}{A}, \tag{3a}$$

$$f_{y1} = \frac{x_1}{A}, \tag{3b}$$

$$f_{x2} = \frac{-y_2}{A}, \tag{3c}$$

$$f_{y2} = \frac{x_2}{A}. \tag{3d}$$

Therefore, Eqs. (3a)-(3d) express the frequency-to-spatial-component relationship for the cell 200 defined by the spatial vectors $v_1$ 206 and $v_2$ 208. Although, in general, the frequency components, $f_{x1}, f_{y1}, f_{x2}$, and $f_{y2}$ are real numbers, they are also rational numbers completely defined by the four integer coordinate values, $x_1, y_1, x_2$, and $y_2$. Since Eqs. (3a)-(3d) describe a corresponding "mapping" of the frequency components to the spatial components, it will be appreciated by those skilled in the art that any analysis of the moiré-free conditions in the frequency domain are capable of easy translation into a spatial domain specification. It will further be appreciated that, while the above equations are developed in relation to the non-orthogonal halftone cell 200 having a parallelogram-like shape, it is apparent that the above equations may suitably describe other non-parallelogram shaped cells, for example, squares, rectangles, triangles, ellipses, etc., in accordance with the subject application.

Continuing with the example depicted in FIGS. 2 and 3, a parallelogram may be specified by the two frequency vectors $V_1$ 306 and $V_2$ 308, such that the frequency domain parallelogram is a rotated and scaled version of the parallelogram halftone 200 screen with a 90° rotation and 1/A scaling. Thus, if the following condition:

$$x_1/y_1 = -y_2/x_2, \qquad (4)$$

is satisfied, the general parallelogram becomes a rectangle. Furthermore, if:

$$x_1 = \pm y_2, \text{ and} \qquad (5a)$$

$$y_1 = \mp x_2, \qquad (5b)$$

then the parallelogram becomes a square.

According to one particular application of the subject application, the non-orthogonal halftone screens are capable of providing exact solutions for moiré-free color halftoning. For example, in color printing, the undesirable moiré can result from the superposition of the halftone screens of the different process colorants, e.g. cyan, magenta, yellow, black, and interaction between the screens. The interactions can be due to "unwanted optical absorption" or physical interaction, such as development suppression of one colorant by another colorant. Using Fourier analysis applied to halftone screens, the result caused by superposition of two different colorants may be expressed as their frequency-vector difference, $V_{cm} = V_c \pm V_m$, where $V_c$ and $V_m$ are two frequency components from two different colorants, e.g., cyan and magenta, and $V_{cm}$ is the difference vector. Since each Fourier component has a corresponding conjugate, i.e. there is always a frequency vector $-V_c$ that represents the conjugate component of $V_c$, the sign definition of frequency vectors is rather arbitrary. For each parallelogram screen, there are two fundamental frequency vectors, therefore, the color mixing of two screens for two different colorants yields four difference vectors. If any one of these difference vectors is much shorter than the cut-off frequency of the sensitivity function of the human visual system and not very close to zero, there is a possibility to have two-color (ant) moiré appearing on the halftone output at the frequency represented by the corresponding difference vector. Given that the common strategy to avoid any two-color moiré is to make sure that no two-color difference vector will be too small, the two-color moiré-free condition can be summarized by:

$$|V_c \pm V_m| > V_{min}, \qquad (6)$$

where $V_c = V_{c1}, -V_{c1}, V_{c2}, -V_{c2}$; $V_m = V_{m1}, -V_{m1}, V_{m2}, -V_{m2}$, and $V_{min}$ is a frequency limit set at somewhere 50-70 line-per-inch for just-noticeable moiré s.

The skilled artisan will appreciate that the most troublesome moiré is the three-colorant moiré, usually appearing as the cyan-magenta-black moiré in prints produced by CMYK four-color printers. As an extension of the two-color case, the three-color moiré-free condition can be summarized by:

$$|V_c \pm V_m \pm V_k| > V_{min}, \qquad (7)$$

where $V_c = V_{c1}, -V_{c1}, V_{c2}, -V_{c2}$; $V_m = V_{m1}, -V_{m1}, V_{m2}, -V_{m2}$; $V_k = V_{k1}, -V_{k1}, V_{k2}, -V_{k2}$, and $V_{min}$ is set similar to the two-color case. Since there are altogether thirty-two different combinations of different colorant components, practically, to make all three-color difference vectors, as well as all two-color difference vectors, large enough to avoid any color moiré is very difficult unless the halftone screens have very high fundamentals frequencies, e.g. higher than 200 line-per-inch. Another aspect of the moiré-free condition is to make two of the three-color difference vectors null while keeping the remaining differences large. It should be appreciated that the two frequency vectors $V_1$ and $-V_1$ are exchangeable. Further, it should be appreciated that the arbitrary indices 1 and 2 may be exchanged between the two frequency vectors $V_1$ and $V_2$ in each color separation. Thus, given that both the signs and the indices of the frequency vectors are defined somewhat arbitrarily, without losing the generality, the three-color moiré-free condition may be specified by the following two vector equations:

$$V_{c1} + V_{m1} + V_{k1} = 0, \text{ and} \qquad (8a)$$

$$V_{c2} + V_{m2} + V_{k2} = 0. \qquad (8b)$$

It is not difficult to prove that, once the two equations, (8a) and (8b), are satisfied, the remaining combinations of three color components are equal to a linear combination of higher-order harmonics from two colors. In most practical applications, this will satisfy the inequality set forth in Eq. (7).

Using the scalar components of the frequency representation and Eqs. (3a)-(3d), and the above moiré-free conditions, a scalar representation of Eqs. (8a)-(8b) may be translated into scalar equations (9a)-(9d) as follows:

$$\frac{x_{c_1}}{A_c} + \frac{x_{m_1}}{A_m} + \frac{x_{k_1}}{A_k} = 0, \qquad (9a)$$

$$\frac{y_{c_1}}{A_c} + \frac{y_{m_1}}{A_m} + \frac{y_{k_1}}{A_k} = 0, \qquad (9b)$$

$$\frac{x_{c_2}}{A_c} + \frac{x_{m_2}}{A_m} + \frac{x_{k_2}}{A_k} = 0, \text{ and} \qquad (9c)$$

$$\frac{y_{c_2}}{A_c} + \frac{y_{m_2}}{A_m} + \frac{y_{k_2}}{A_k} = 0. \qquad (9d)$$

It should be appreciated that, if the respective spatial coordinate values $x_1$, $x_2$, and $y_1$, $y_2$ are integer values, the four equations (9a)-(9d) may be converted to:

$$A_m A_k x_{c_1} + A_c A_k x_{m_1} + A_c A_m x_{k_1} = 0 \qquad (10a)$$

$$A_m A_k y_{c_1} + A_c A_k y_{m_1} = A_c A_m y_{k_1} = 0 \qquad (10b)$$

$$A_m A_k x_{c_2} + A_c A_k x_{m_2} + A_c A_m x_{k_2} = 0, \text{ and} \qquad (10c)$$

$$A_m A_k y_{c_2} + A_c A_k y_{m_2} + A_c A_m y_{k_2} = 0. \qquad (10d)$$

Using Eq. (2) and the three areas $A_c$, $A_m$ and $A_k$ in Eqs. (10a)-(10d), it follows, therefore that the values of the parallelogram area are given by, or rewritten as:

$$A_c = |x_{c_1} y_{c_2} - x_{c_2} y_{c_1}|, \qquad (11a)$$

$$A_m = |x_{m_1} y_{m_2} - x_{m_2} y_{m_1}|, \qquad (11b)$$

$$A_k = |x_{k_1} y_{k_2} - x_{k_2} y_{k_1}| \qquad (11c)$$

Alternatively, two vector equations in spatial vectors can be derived from Eqs. (9a)-(9d), i.e.

$$\frac{v_{c_1}}{A_c} + \frac{v_{m_1}}{A_m} + \frac{v_{k_1}}{A_k} = 0, \text{ and} \qquad (12a)$$

-continued $$\frac{v_{c_2}}{A_c} + \frac{v_{m_2}}{A_m} + \frac{v_{k_2}}{A_k} = 0. \tag{12b}$$

The present disclosure and embodiments described herein include methods and halftone configurations that provide moiré-free halftone geometries via shearing of the frequency vectors in one or more directions, e.g. the fast scanning or slow scanning directions. For example, a frequency vector extending from the origin to a point in the first quadrant may be used as an example of shearing, such that the endpoint of the vector in the first quadrant is shifted a predetermined amount along a line parallel to the x-axis, while the other end of the vector remains fixed at the origin. Each point along that parallel line corresponds to a different halftone in the spatial domain, such that the movement of the vector endpoint would "shear" the halftone structures in the spatial domain. Halftone designers consider many options to deliver a screen with desirable characteristics, and often must settle for less than desirable results. The present method presents a new option with several beneficial properties compared to conventional screens. In addition to enabling new geometries via shearing, various shearing parameters can be made available to knowledgeable users so they can adjust given halftone sets to have shear that may be preferred for particular images, such as tinted text, tinted italic text, angled graphics, and the like.

As discussed in greater detail below, one aspect of the subject application enables halftone geometries of interest by shearing in the fast-scanning direction via the application of a line-to-line offset in the start-of-scan signal for each raster line produced by a laser scanner. The offsets of interest would tend to be linearly increasing with raster line number.

It is generally desired to use halftones that are moiré-free, and not beat with multiple frequency components from the raster output scanner, e.g. interference of two frequency components that cause visibility issues. Previous attempts at beat avoidance resulted in custom designed halftone screen sets that comprise a particular geometry that avoids raster output scanner beating by setting the frequency components of that geometry as harmonics of the raster output scanner. Unfortunately, those screen sets contain a 0°/90° screen, which users find objectionable and that have a negative interaction with calibration efforts.

More generally, the present application improves digital halftoning by increasing the number of screen frequencies and/or angles that are realizable; while also increasing the accuracy in approximating an irrational screen. The skilled artisan will appreciate that the subject application, via the screen frequencies and angles increase, provide freedom in meeting conflicting requirements such as moiré-free, beating avoidance, screen visibility, and halftone artifacts. It will also be appreciated by those skilled in the art that the increase in accuracy for irrational screen approximation is advantageous where accuracy for approximating certain halftone frequencies (e.g. 75°) is essential.

Returning to FIG. 1, at step 106, a shearing value (s) for application to the fundamental frequency vectors ($V_1, V_2$) 306 and 308 is selected for offsetting the example halftone cell 200 of FIG. 2. It will be appreciated by those skilled in the art that the subject application provides for multiple means for selecting a suitable shearing value (s), depending upon the desired output halftone screen. Such values (s) may be selected by, for example and without limitation, pixel clock manipulation, distance in the x-direction and/or y-direction, angle, specific pixel locations, and the like.

Figure 4:
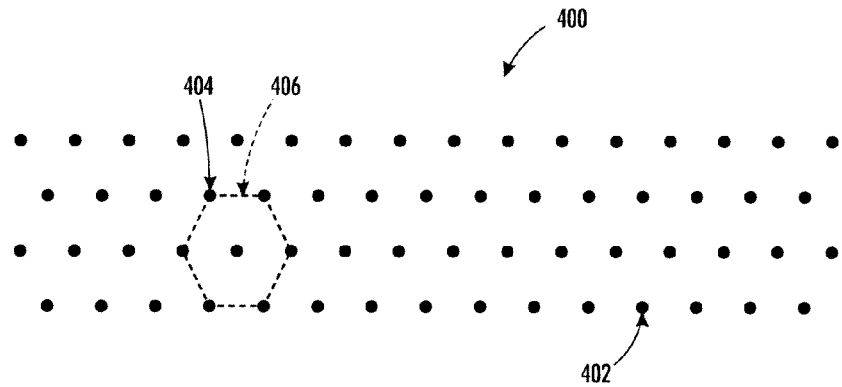
FIG. 4 illustrates alternative start-of-scanline capabilities in accordance with one embodiment of the subject application.

It will be appreciated that offsetting the pixel clock for different scan lines may enable an improved halftone image. FIG. 4 illustrates an alternating start-of-scan diagram 400 as scan lines of individual pixels 402.

Alternating start-of-scan offsets for every other line of pixels 402 to form a hexagonal-like pixel grid 404 thus generates hexagonal halftone cells 406 resulting in scan lines offset by alternating between two phases of a pixel clock. [Have removed the confusing language. We want to leave enough in here, including FIG. 4, to provide a bit of basis for what is stated later on in the application, and if need be, during prosecution]

Figure 5:
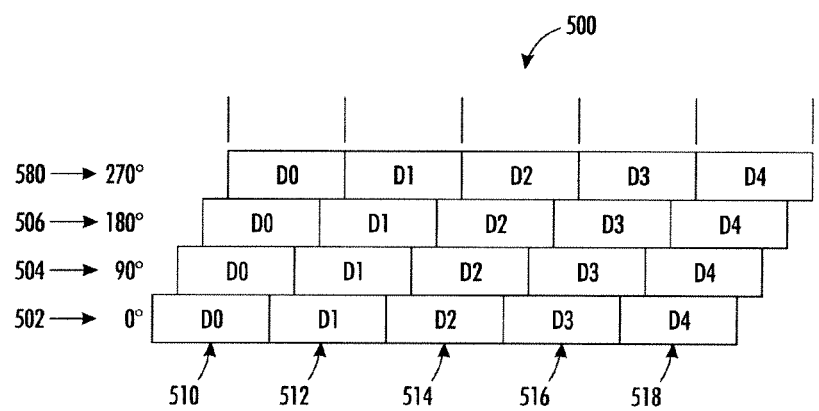
FIG. 5 illustrates a 4-phase clock employed in the prototype VCSEL ROS in accordance with one embodiment of the subject application.

FIG. 5 illustrates a 4-phase clock employed in one example vertical-cavity surface-emitting laser raster output scanner, such as the associated control module (not shown). A scan line is capable of starting on any pixel boundary of any of the phases 500. The use of 4 phases at 2400 spi provides a resolution of 9600 spi for start-of-scan. Those skilled in the art will appreciate that current FPGA's are available with the capabilities to generate 8 and 16 phases in the event that such additional resolution is needed. Thus it will be appreciated by the skilled artisan that the selection of 4 phases is for example purposes only. In accordance with one embodiment of the subject application, start-of-scan phases and full pixel offset are capable of being varied from scan line to scan line. It will be appreciated by those skilled in the art that while this capability may be used for registration purposes, the subject application will use it to achieve certain halftone geometries.

As illustrated in FIG. 5, a phase begins at a 0° angle raster line 502. The next raster line is at a 90° phase 504. The next raster is at a 180° phase 506. The next raster line is at a 270° phase 508. Each raster line has a series of sections labeled D0, 510, D1, 512, D2, 514, D3, 516, and D4, 518. The arrangement is slightly askew such that the raster line segments D0 to D4 do not overlap, i.e. align directly in the slow scan direction, instead stacking above and below each other in a brick wall type arrangement. Thus, the raster line in the 90° phase line contains a D1 segment that overlaps with the D0 segment in 180° and 270°, phase lines while also overlapping with the D2 segment in the 0° phase line. Usage of the output of the phase, or pixel, clock described with respect to FIG. 5 will be more readily understood in conjunction with the methodologies described below.

In accordance with one embodiment of the subject application, shearing is performed in the slow-scanning direction, by one or more means that are capable of being used for scan line alignment. For example, in a raster output scanner imaging system, the raster output scanner itself or an optical component, such as a mirror, can be tilted to shear the scan line in the slow scan direction. That is, the entire raster output scanner is moved with a stepper motor to a target angle, or mirrors in the optical system are tilted to align the scan line. In image bar imaging systems, a timing offset can be applied to each column of pixels or the bar can be tilted to align the scan line, i.e. controllable pixel column timing for slow-scan raster line adjustment.

According to one embodiment of the subject application, shearing is performed by varying the starting phase of scanning. That is, the selection of a shear (s) is suitably defined in terms of linear horizontal displacement as a function of y. Accordingly, described hereinafter is an example of shearing along one direction so as to enable new halftone geometries. In such an example embodiment, the shearing corresponds to an offset in the fast-scan direction. The skilled artisan will appreciate that the following analysis is also applicable to shearing in the slow-scan direction.

The effect of linearly varying the phase at start-of-scan is a horizontal linear shearing of the two-dimensional image, i.e. horizontal shearing of the cell 200 of FIG. 2. Thus, the shear (s) may be designated as ($\epsilon$), which represents a shearing offset in the horizontal direction, which can be considered a linear coefficient between the horizontal shift ($\Delta x$) and the vertical distance, i.e. the slow-scan position (y) of the raster line, such that:

$$\Delta x = \epsilon \cdot y \quad (13)$$

The actual output location of a point specified by the nominal coordinate ($x_o$, $y_o$) thereby becomes:

$$x = x_o + \epsilon y_o, \text{ and} \quad (14a)$$

$$y = y_o \quad (14b)$$

It will be appreciated by those skilled in the art that while reference is made to selecting a shearing value (s) as ($\epsilon$) for representation of a shift in the horizontal direction, (s) is capable of implementation in the embodiments described below as an angular offset of the frequency vectors ($V_1$, $V_2$), as a periodic or line-to-line offset in the start-of-scan signal for a raster line, a shift in the vertical direction (e.g. $\Delta y$), a periodic displacement as a function of y, or the like. According to one example embodiment, the shearing offset (s) is selected in accordance with a desired modification to a halftone geometry, as will be appreciated by those skilled in the art. For example, the value (s) may be selected so as to rotate one or more halftone screens, so as to avoid a moiré-effect, as set forth in greater detail below.

For example purposes, (s) is specified hereinafter in terms of linear horizontal displacement as a function of y, designated as the shearing value ($\epsilon$). Returning to FIG. 1, once the shearing value ($\epsilon$) has been selected at step 106, at least the first fundamental frequency vector ($V_1$) 306 or the second fundamental frequency vector ($V_2$) 308 is sheared accordingly at step 108. In accordance with the discussions above, the spatial vectors ($v_1$ 206 and $v_2$ 208) of the halftone written with start-of-scan shear become:

$$v_1(x_1, y_1) = v_1(x_{o1} + \epsilon y_{o1}, y_{o1}), \text{ and} \quad (15a)$$

$$v_2(x_2, y_2) = v_2(x_{o2} + \epsilon y_{o2}, y_{o2}). \quad (15b)$$

The skilled artisan will therefore appreciate that the area $A_o$ specified by the nominal vectors $v_1(x_{o1}, y_{o1})$ and $v_2(x_{o2}, y_{o2})$ is equal to the area specified by the sheared vectors $A_{\epsilon o}$:

$$A_o = |x_{o1} y_{o2} - x_{o2} y_{o1}| \quad (16c)$$

$$A_{\epsilon o} = |(x_{o1} + \epsilon y_{o1}) y_{o2} - (x_{o2} + \epsilon y_{o2}) y_{o1}| = A_o \quad (16d)$$

Accordingly, the two frequency vectors $V_1(f_{x1}, f_{y1})$ and $V_2(f_{x2}, f_{y2})$ of the sheared output can be written as:

$$f_{x1} = \frac{-y_{o1}}{A_o}, \quad (17a)$$

$$f_{y1} = \frac{x_{o1}}{A_o} + \epsilon \frac{y_{o1}}{A_o}, \quad (17b)$$

$$f_{x2} = \frac{-y_{o2}}{A_o}, \quad (17c)$$

$$f_{y2} = \frac{x_{o2}}{A_o} + \epsilon \frac{y_{o2}}{A_o}. \quad (17d)$$

At step 110, the computer 150 or other suitable computing device modifies the moiré-free conditions in accordance with the sheared fundamental frequency vector(s) ($V_1$, $V_2$) 306 and/or 308 so as to generate a sheared halftone screen corresponding thereto. That is, the halftone cell 200 is suitably sheared based upon the corresponding frequency vectors, so as to reduce moiré patterning. At step 112, the sheared halftone screen is suitably output for use in moiré-free halftoning operations.

In accordance with a previously discussed example implementation, e.g. a reproduction of a photograph in a magazine requiring flesh tones, once a set of halftone screens is identified, an attempt to output a reproduction of the image is produced. In the event that moiré patterns are observed, one of the halftone screens is identified, and the fundamental frequency vectors corresponding to a non-orthogonal halftone cell of that identified screen are determined. A shearing value (s) is then selected. As set forth above, this shearing value (s) may be ($\epsilon$), i.e. a simple change in the distance along the fast scanning direction as a function of y (e.g. a few micron difference in placement), altering the angle of the vector (from which a suitable (s) may be derived), altering distances in both the fast and slow scanning direction, utilizing a pixel clock, or the like. The fundamental frequency vectors are then sheared accordingly, wherein the above-identified moiré-free conditions are satisfied and the first halftone screen corresponding to the modified frequency vectors is output. The skilled artisan will appreciate that the additional colorant screens are then similarly reproduced (discussed below). Furthermore, the skilled artisan will appreciate that calculation of the various remaining offsets for the additional colorant screens may be accomplished as set forth above, by satisfying the moiré-free conditions using the initially selected offset ($\epsilon$), and the like.

The methodology of FIG. 1 will be better understood in conjunction with the example implementations discussed hereafter, with respect to three-color moiré-free geometries with shearing in one direction and shearing in two directions. The skilled artisan will appreciate that while the following examples illustrate usage of ($\epsilon$), linear horizontal displacement as a function of y, other shears (s) may be selected an implemented (angle, periodic displacement as a function of y, or the like) in accordance with the methods and systems set forth herein.

Three-Color Moiré-Free Geometry with One Shearing

Those skilled in the art will appreciate that application of the shearing to three-color halftoning processes is also capable of reducing moiré patterning. Accordingly, by shearing only in the fast scanning (e.g. x-direction) for cyan, magenta, and black screens using corresponding offsets $\epsilon_c$, $\epsilon_m$, $\epsilon_k$, respectively, the three-color moiré-free condition of Eqs. (9a)-(9d) may be modified as follows:

$$\frac{x_{co1}}{A_{co}} + \frac{x_{mo1}}{A_{mo}} + \frac{x_{ok1}}{A_{ko}} + \frac{\epsilon_c y_{co1}}{A_{co}} + \frac{\epsilon_m y_{mo1}}{A_{mo}} + \frac{\epsilon_k y_{ok1}}{A_{ko}} = 0, \quad (18a)$$

$$\frac{y_{co1}}{A_{co}} + \frac{y_{mo1}}{A_{mo}} + \frac{y_{ko1}}{A_{ko}} = 0, \quad (18b)$$

$$\frac{x_{co2}}{A_{co}} + \frac{x_{mo2}}{A_{mo}} + \frac{x_{ok2}}{A_{ko}} + \frac{\epsilon_c y_{co2}}{A_{co}} + \frac{\epsilon_m y_{mo2}}{A_{mo}} + \frac{\epsilon_k y_{ok2}}{A_{ko}} = 0, \quad (18c)$$

and $$\frac{y_{co2}}{A_{co}} + \frac{y_{mo2}}{A_{mo}} + \frac{y_{ko2}}{A_{ko}} = 0 \quad (18d)$$

EXAMPLE 1

The following example serves to illustrate that new geometries are enabled by shearing of frequency vectors in accordance with one embodiment of the subject application. Accordingly, in the following example, it is shown that a screen set that is not moiré-free may be made moiré-free by use of appropriate shearing according to the subject application. Thus, the following nominal screens are used:

$$v_{co1}(4,1), v_{co2}(2,-4);$$

$$v_{co1}(-2,-4), v_{mo2}(-4,1) \text{ and}$$

$$v_{ko1}(-3,3), v_{ko2}(3,3).$$

The corresponding screen areas specified by the above vectors are:

$$A_{co}=18, A_{mo}=18 \text{ and } A_{ko}=18.$$

Figure 6:
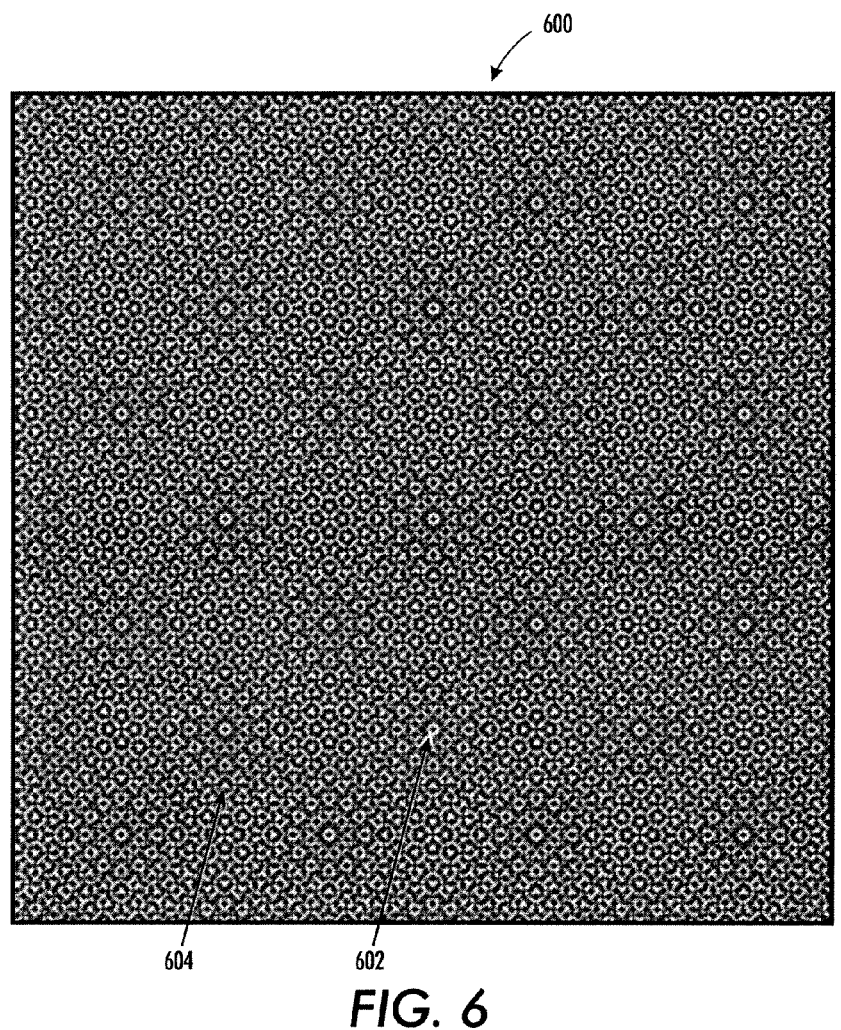
FIG. 6 illustrates a halftone pattern with visible moiré s by a normal screen setting in accordance with one embodiment of the subject application.

FIG. 6 illustrates the digital simulation of the halftone output 600 corresponding to the nominal screens above. As shown in FIG. 6, the halftone output of above screen set is not moiré-free; instead, CMK three-color moirés 602 and 604 are noticeable at both plus and minus 45 degrees.

The subject application provides for multiple shearing possibilities that are capable of yielding a moiré-free screen set from these nominal halftones. That is, multiple values of the offsets $\epsilon_c$, $\epsilon_m$, and $\epsilon_k$ are capable of being determined in accordance with the methodology of the subject application, and the use of the following values is for example purposes only. Therefore, in continuing with the preceding example, one solution to overcome the noted moiré issues uses the following values:

$$\epsilon_c = \tfrac{1}{5};$$

$$\epsilon_m = -\tfrac{1}{5},$$

$$\epsilon_k = 0.$$

With these selected parameters, the sheared halftone output shows the following spatial periodicities:

$$v_{c1}(4.2,1), v_{c2}(1.2,-4),$$

$$v_{m1}(-1.2,-4), v_{m2}(-4.2,1), \text{ and}$$

$$v_{k1}(-3,3), v_{k2}(3,3).$$

In a 600×600 dot-per-inch printer, the halftoning result obtains the corresponding halftone frequencies; and the combination thereof is three-color moiré-free.

$$V_{c1}(-33.3, 140), V_{c2}(133.3, 40), \text{ or}$$
$$V_{c1}(143.9 \text{ lpi @}13.4°), V_{c2}(139.2 \text{ lpi @}73.3°),$$

$$V_{m1}(-133.3, 40), V_{m2}(33.3, 140), \text{ or}$$
$$V_{m1}(139.2 \text{ lpi @}73.3°), V_{m2}(143.9 \text{ lpi @}-13.4°),$$
and $$V_{k1}(100,100), V_{k2}(-100,100), \text{ or}$$
$$V_{k1}(141.4 \text{ @}-45.0°), V_{k2}(141.4 \text{ lpi @}45.0°).$$

Figure 7:
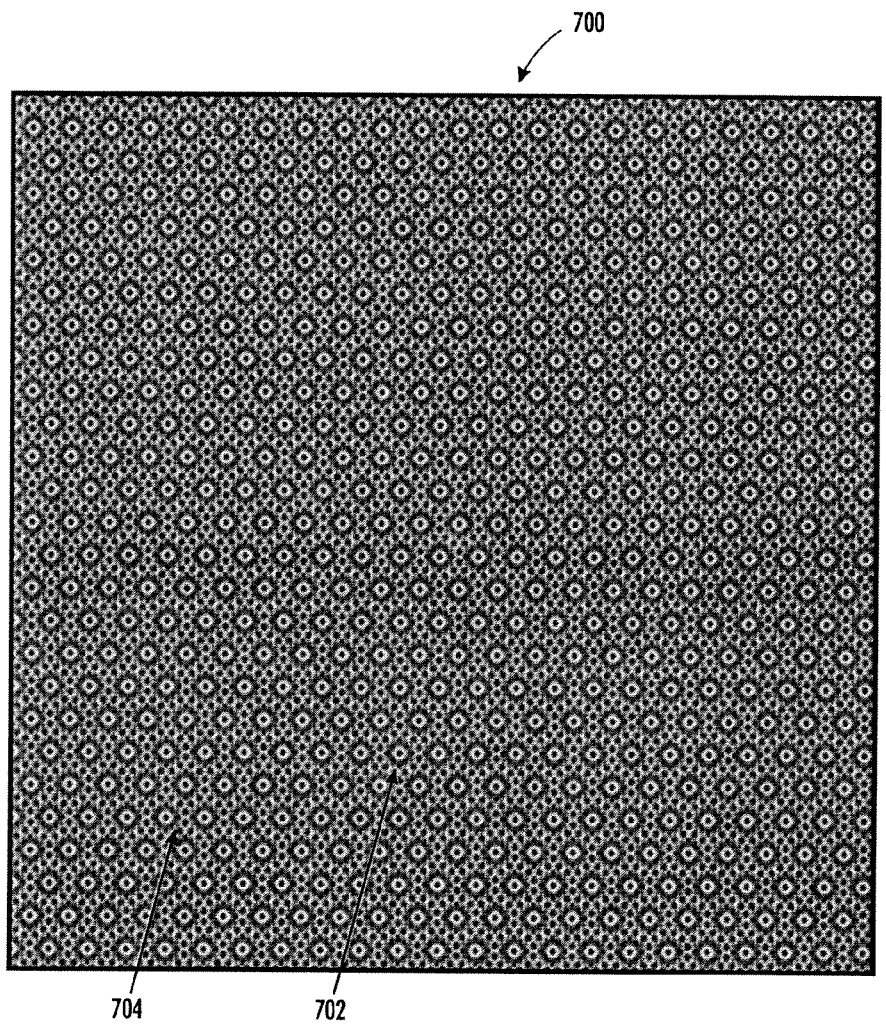
FIG. 7 illustrates a digital simulated halftone output of a three-color moiré-free geometry with one shearing in accordance with one embodiment of the subject application.

FIG. 7 illustrates a digital simulation of the halftone output 700 by the above example as a three-color moiré-free geometry with one shearing. It will be appreciated by those skilled in the art that the simulated halftone output 700 contains no discernible moiré issues. It should also be noted that at both plus and minus 45 degrees, the CMK three-color moirés 602 and 604 are no longer visible in the output 700.

Figure 8:
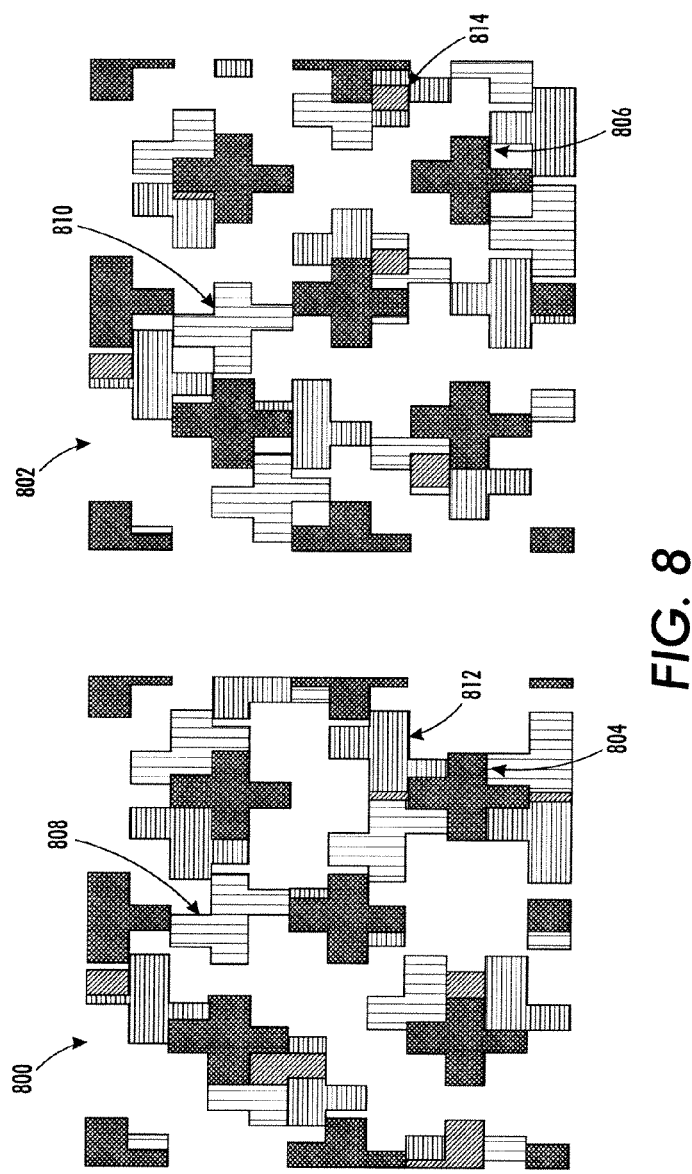
FIG. 8 illustrates a close-up view of the halftone screens associated with FIG. 6 and FIG. 7 in accordance with one embodiment of the subject application.

FIG. 8 depicts an extreme close-up view of the halftone screens of FIG. 6 (screen 800) and FIG. 7 (screen 802). As shown in FIG. 8, the halftone cells of the non-sheared screen black 804, cyan 808, and magenta 810 are aligned in such a manner as to give rise to the moiré pattern exhibited in FIG. 6. In accordance with application of the methodologies described above, shearing is advantageously performed using the shearing values ($\epsilon_c = \tfrac{1}{5}$; $\epsilon_m = -\tfrac{1}{5}$, $\epsilon_k = 0$). That is, the black 804 cells are not offset ($\epsilon_k = 0$), depicted on the screen 802 as the black cell 806. The cyan 808 cells are offset by $\epsilon_c = \tfrac{1}{5}$, which result in the cyan cells 810 of the screen 802. Additionally, the magenta 812 cells are offset by $\epsilon_m = -\tfrac{1}{5}$, which result in the magenta cells 814 of the screen 802. The skilled artisan will appreciate that subtle movement of the aforementioned cells from no shearing (800) to sheared (802) is visible in FIG. 8.

Figure 9:
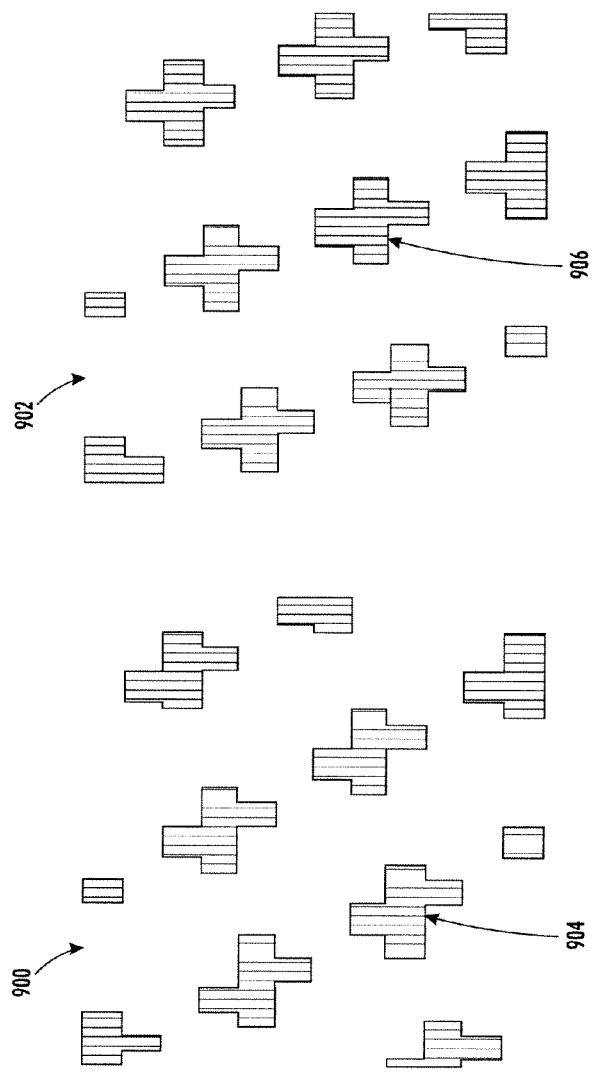
FIG. 9 illustrates a close-up view of the cyan halftone screens associated with FIG. 8 in accordance with one embodiment of the subject application.
Figure 10:
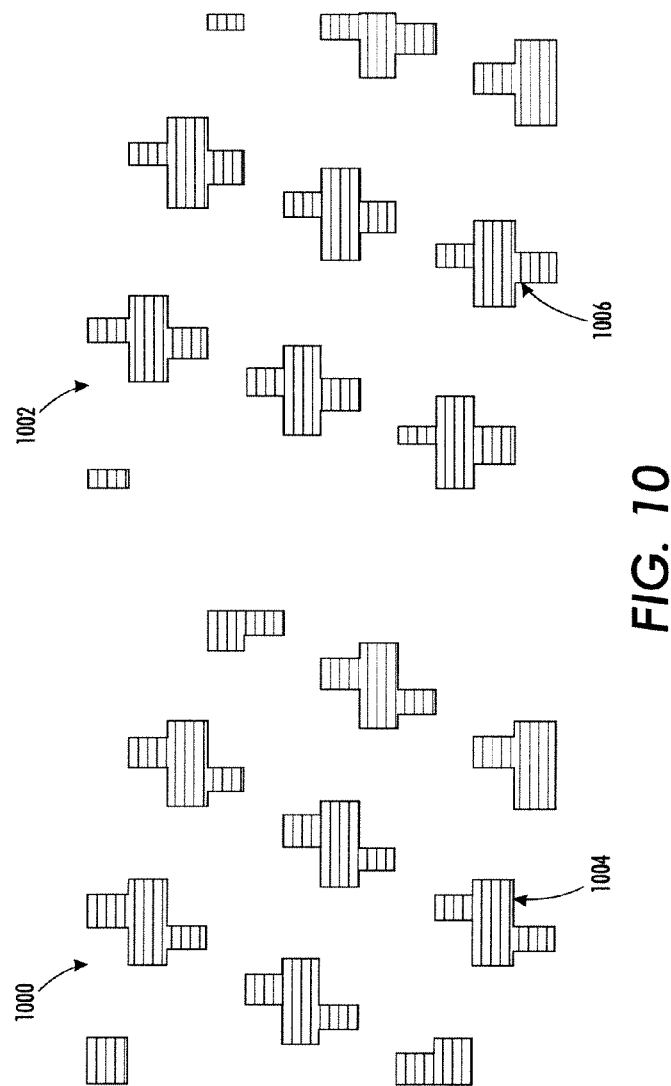
FIG. 10 illustrates a close-up view of the magenta halftone screens associated with FIG. 8 in accordance with one embodiment of the subject application.

FIG. 9 illustrates only the cyan halftone screen corresponding to the set of screens in FIG. 8. The first screen 900 represents an unsheared, i.e. original cyan halftone screen corresponding to the moiré patterned image of FIG. 6. In contrast, the second screen 902 represents the sheared cyan halftone screen corresponding to the moiré-free image of FIG. 7. It should be appreciated that the cells 904 and 906 clearly illustrate a difference, i.e. shear, resulting from application of the selected shearing value by $\epsilon_c = \tfrac{1}{5}$. FIG. 10 illustrates only the magenta halftone screen corresponding to the set of screens in FIG. 8. The first screen 1000 represents an unsheared, i.e. original magenta halftone screen corresponding to the moiré patterned image of FIG. 6. In contrast, the second screen 1002 represents the sheared cyan halftone screen corresponding to the moiré-free image of FIG. 7. It should be appreciated that the cells 1004 and 1006 clearly illustrate a difference, i.e. shear, resulting from application of the selected shearing value by $\epsilon_m = -\tfrac{1}{5}$.

Three-Color Moiré-Free Geometry with Two Shearings

By shearing cyan, magenta and black halftone in the x-direction, respectively by $\epsilon_{xc}$, $\epsilon_{xm}$, $\epsilon_{xk}$, and those halftones in the y-direction respectively by, $\epsilon_{yc}$, $\epsilon_{ym}$, $\epsilon_{yk}$, the three-color moiré-free condition expressed above in Eqs. (9a)-(9d) may be modified as follows:

$$\frac{x_{co1}}{A_{co}} + \frac{x_{mo1}}{A_{mo}} + \frac{x_{ok1}}{A_{ko}} + \frac{\epsilon_{xc} y_{co1}}{A_{co}} + \frac{\epsilon_{xm} y_{mo1}}{A_{mo}} + \frac{\epsilon_{xk} y_{ok1}}{A_{ko}} = 0, \quad (19a)$$

$$\frac{y_{co1}}{A_{co}} + \frac{y_{mo1}}{A_{mo}} + \frac{y_{ko1}}{A_{ko}} + \frac{\epsilon_{yc} x_{co1}}{A_{co}} + \frac{\epsilon_{ym} x_{mo1}}{A_{mo}} + \quad (19b)$$
$$\frac{\epsilon_{yk} x_{ko1}}{A_{ko}} + \frac{\epsilon_{xc}\epsilon_{yc} y_{co1}}{A_{co}} + \frac{\epsilon_{xm}\epsilon_{ym} y_{mo1}}{A_{mo}} + \frac{\epsilon_{xk}\epsilon_{ym} y_{ko1}}{A_{ko}} = 0,$$

$$\frac{x_{co2}}{A_{co}} + \frac{x_{mo2}}{A_{mo}} + \frac{x_{ok2}}{A_{ko}} + \frac{\epsilon_{xc} y_{co2}}{A_{co}} + \frac{\epsilon_{xm} y_{mo2}}{A_{mo}} + \frac{\epsilon_{xk} y_{ok2}}{A_{ko}} = 0, \quad (19c)$$
and $$\frac{y_{co2}}{A_{co}} + \frac{y_{mo2}}{A_{mo}} + \frac{y_{ko2}}{A_{ko}} + \frac{\epsilon_{yc} x_{co2}}{A_{co}} + \frac{\epsilon_{ym} x_{mo2}}{A_{mo}} + \quad (19d)$$
$$\frac{\epsilon_{yk} x_{ko2}}{A_{ko}} + \frac{\epsilon_{xc}\epsilon_{yc} y_{co2}}{A_{co}} + \frac{\epsilon_{xm}\epsilon_{ym} y_{mo2}}{A_{mo}} + \frac{\epsilon_{xk}\epsilon_{ym} y_{ko2}}{A_{ko}} = 0,$$

EXAMPLE 2

The following example serves to illustrate that new geometries are enabled by shearing of frequency vectors in both the fast-scanning and slow-scanning directions according to one embodiment of the subject application. Accordingly, in the following example, it is shown that a screen set that is not moiré-free may be made moiré-free by use of appropriate shearing in both the x-direction and the y-direction according to the subject application. Thus, the following nominal screens are used:

$$v_{co1}(1,4), v_{co2}(4,-1),$$

$$v_{mo1}(-4,-1), v_{mo2}(-1,4), \text{ and}$$

$$v_{ko1}(-3,3), v_{ko2}(3,3).$$

The corresponding screen areas specified by the above vectors are:

$A_{c0}=17$, $A_{mo}=17$ and $A_{ko}=18$.

As set forth above with respect to single direction shearing, it is possible to produce a moiré-free set from this nominal set using different shearing parameters. The following set of values is for example purposes only and as such, the skilled artisan will appreciate that other values of suitable offsets may be determined in accordance with the subject application. Accordingly, the following offsets serve to illustrate the application of two direction shearing:

$\epsilon_{xc}=1/30$, $\epsilon_{xm}=-1/30$, $\epsilon_{xk}=0$, $\epsilon_{yc}=1/30.1$, $\epsilon_{ym}=-1/30.1$, and $\epsilon_{yk}=0$.

Using the above-identified offset values, the nominal screen values, and Eqs. (19a)-(19d), the actual halftone output shows the following periodicities:

$v_{c1}(1.1333, 3.9623)$, $v_{c2}(3.9667, -1.1318)$;

$v_{m1}(-3.9667, -1.1318)$, $v_{m2}(-1.1333, 3.9623)$ and $v_{k1}(-3, 3)$, $v_{k2}(3, 3)$.

In a 600×600 dot-per-inch printer, the halftoning result obtains the corresponding halftone frequencies and their combination is three-color moiréfree:

$V_{c1}(-139.9, 40)$, $V_{c2}(39.9, 140)$, or
$\quad V_{c1}(145.5 \text{ lpi } @74.0°)$, $V_{c2}(145.6 \text{ lpi } @-15.9°)$, $V_{m1}(39.9, -140)$, $V_{m2}(139.9, 140)$, or
$\quad V_{m1}(145.6 \text{ lpi } @-15.9°)$,
$\quad V_{m2}(145.5 \text{ lpi } @-74.0°)$, and $V_{k1}(100, 100)$, $V_{k2}(-100, 100)$, or
$\quad V_{k1}(141.4 \text{ lpi } @-45.0°)$, $V_{k2}(141.4 \text{ lpi } @45.0°)$.

Figure 11:
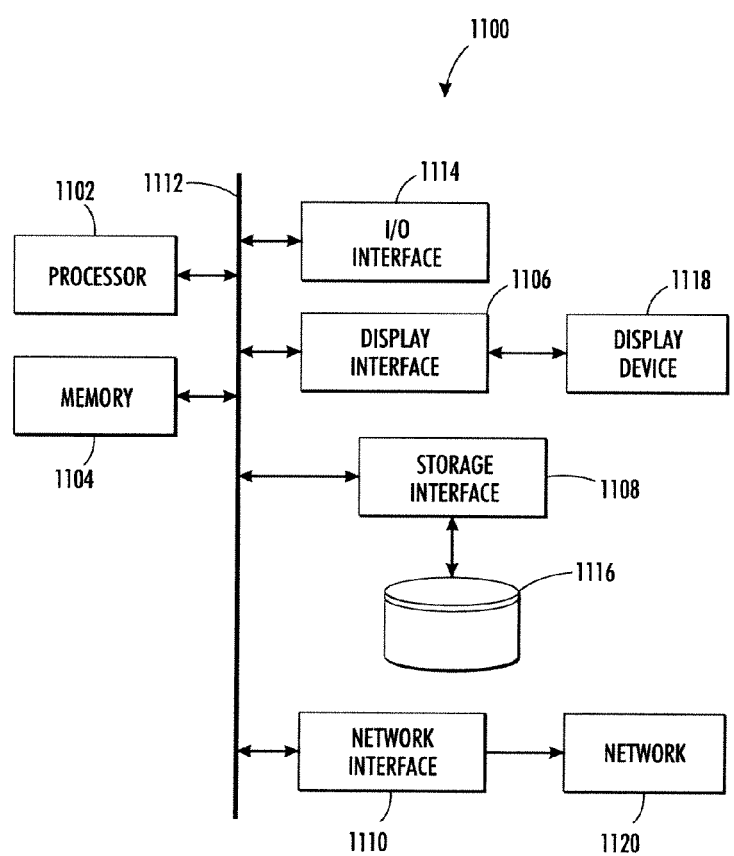
FIG. 11 illustrates a computer system that is capable of implementation to facilitate generation of halftone screens for moiré-free color halftoning using frequency vector shearing in accordance with one embodiment of the subject application.

Turning now to FIG. 11, illustrated is a representative computer system 1100 (depicted in FIG. 1 as the computer 150) that facilitates generating halftone screens for moiré-free color halftoning in connection with one embodiment of the subject application. The computer system 1100 includes a processor unit 1102 which is advantageously placed in data communication with memory 1104, which may include, for example and without limitation, non-volatile read only memory, volatile read only memory, random access memory or a combination thereof, a display interface 1106, a storage interface 1108, and a network interface 1110. In one embodiment, interface to the foregoing modules is suitably accomplished via a bus 1112. The processor 1102 executes, and the memory 1104 stores computer-executable instructions for performing the various functions, methods, steps, techniques, and the like, described herein. The processor 1102 and memory 1104 may be integral to each other or remote but operably coupled to each other.

The memory 1104 suitably includes firmware, such as static data or fixed instructions, such as BIOS, system functions, configuration data, and other routines used for operation of the computer system 1100 via the processor 1102. The memory 1104 is further capable of providing a storage area for data and instructions associated with applications and data handling accomplished by the processor 1102.

The display interface 1106 receives data or instructions from other components on the bus 1112, which data is specific to generating a display to facilitate a user interface. The display interface 1106 suitably provides output to a display device 1118, suitably a video display such as a monitor, LCD, plasma, or any other suitable visual output device as will be appreciated by one of ordinary skill in the art.

As will be appreciated by those skilled in the art, the storage interface 1108 is configured to provide a mechanism for non-volatile, bulk or long term storage of data or instructions in the computer system 1100. The storage interface 1108 suitably uses a storage mechanism, such as storage 1116, suitably comprised of a disk, tape, CD, DVD, or other relatively higher capacity addressable or serial storage medium.

The network interface 1110 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration, the network interface 1110 connected to a physical network 1120, suitably comprised of a local area network, wide area network, or a combination thereof.

An input/output interface 1114 in data communication with the bus 1112 is suitably connected with input devices, such as a keyboard, mouse, pointing device, touch screen inputs, or the like. In addition, the input/output interface 1114 is further capable of data output to a peripheral interface, such as a USB, universal serial bus output, SCSI, IEEE 1394 output, or any other interface as may be appropriate for a selected application.

Figure 12:
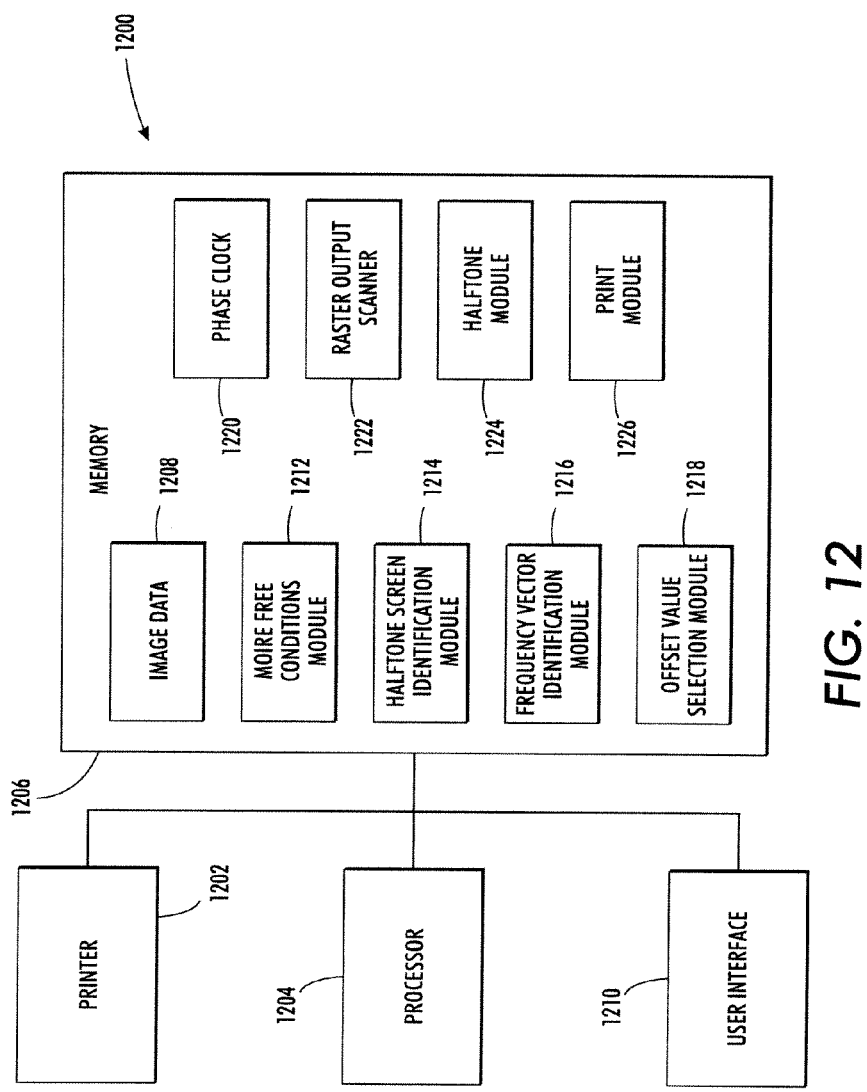
FIG. 12 illustrates a system that facilitates generation of halftone screens for moiré-free color halftoning using frequency vector shearing in accordance with one embodiment of the subject application.

FIG. 12 illustrates a system 1200 that facilitates generating a halftone image by employing a spot function based on polygonal tessellation. The system comprises a print engine 1202 that is coupled to a processor 1204 that executes, and a memory 1206 that stores computer-executable instructions for performing the various functions, methods, techniques, steps, and the like described herein. The processor 1204 and memory 1206 may be integral to each other or remote but operably coupled to each other. In another embodiment, the processor 1204 and memory 1206 are integral to the printer 1202. In another embodiment, the processor and memory reside in a computer (e.g. the computer 150 of FIG. 1) that is operably coupled to the printer 1202.

According to one embodiment of the subject application, the system 1200 comprises the processor 1204 that executes, and the memory 1206 that stores one or more computer-executable modules (e.g. programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Furthermore, or alternatively, one or more of the functions described hereinafter with respect to the modules may be manually performed.

The memory 1206 may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

The memory 1206 stores the above-identified moiré-free color conditions 1212. Upon receipt of image data 1208, which is capable of received or generated by the processor 1204, a scanning component (not shown) of the printer 1202, via a network connection form a suitable image source, or the like. A halftone screen identification module 1214 identifies a screen corresponding to one of the colorants associated with the printer 1202 or display (not shown) associated with the user interface 1210. The halftone screens identified by the module 1214 executed by the processor 1204 include corresponding halftone cells in varying shapes, sizes, and the like, as will be appreciated by those skilled in the art. The skilled artisan will further appreciate that the halftone screens identified may be previously calculated screens, dependent upon the input image data, or the like.

The processor 1204 executes a frequency vector identification module 1216 to identify the fundamental frequency vectors associated with the halftone cell of the identified halftone screens. An offset value selection module 1218 is then executed by the processor 1204 so as to select a suitable offset for application to the halftone screen for avoidance of moiré patterning. In accordance with one embodiment of the subject application, the offset values are capable of being generated in accordance with operations of the phase clock 1220, the raster output scanner 1222, or the like. According to another embodiment of the subject application, the offset value is selected in accordance with an offset distance, such that a desired output screen is identified and the offset value is determined based upon the desired screen. For example, modifying the angle associated with identified frequency vectors results may result in a suitable offset value, similarly shifting one end of the vector along one axis may result in a suitable offset value.

The frequency vectors identified in accordance with the operations of the processor 1204 are then subjected to the moiré-free conditions module 1212 using the selected offset value, so as to generate a corresponding sheared halftone screen. The processor 1204 then repeats this process for each colorant available for the output of the image data 1208 by the printer 1202, for display via the user interface 1210, or the like. According to one embodiment of the subject application, the generated halftone screens are stored in the memory 1206 for later access and subsequent use by the processor 1204 in generating halftoned images that are moiré-free.

Once the frequency vectors have been sheared and the corresponding halftone screen generated, the processor 1204 executes a halftone module 1224 that uses the halftone screens as offset pursuant to the moiré-free condition module 1212, to halftone an image. Image data 1208 is stored in the memory 1206 and may include input image data from which an input image, intermediate image data that is generated at various points during the described process, output image data such as halftone image data, etc. The output image data is provided to a print module 1226 that, when executed by the processor 1204, generates a set of commands or instructions that are executed by the processor 1204 and/or the printer 1202 to print the halftone image. In another embodiment, the output halftone image is displayed graphically on a user interface 1210 that may be integral to the printer 1202, remote but operably coupled thereto, or may reside on a computer such as the computer 150 of FIG. 1. In this manner, the system 1200 can be employed to directly halftone an image or can be used to generate a sampled version of the halftone screen that is moiré-free, which can be used to halftone an image.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for generating halftone screens for moiré-free color halftoning, comprising:
   identifying a first color halftone screen having halftone cells defined by a first fundamental frequency vector ($V_1$) and a second fundamental frequency vector ($V_2$);
   selecting at least one shearing value (s) representative of an offset in at least one of a fast scan direction and a slow scan direction;
   shearing at least one of the first fundamental frequency vector ($V_1$) and the second fundamental frequency vector ($V_2$) for the first halftone screen by application of the shearing value (s) associated therewith; and
   generating a first sheared color halftone screen in accordance with at least one of the sheared first fundamental frequency vector ($V_1$) and the second fundamental frequency vector ($V_2$) so as to avoid moiré image effects.

2. The method of claim 1, wherein the sheared first fundamental frequency vector $V_1(f_{x1}, f_{y1})$ and the sheared second fundamental frequency vector $V_2(f_{x2}, f_{y2})$ are expressed as:

$$f_{x1} = \frac{-y_{o1}}{A_o},$$

$$f_{y1} = \frac{x_{o1}}{A_o} + \varepsilon \frac{y_{o1}}{A_o},$$

$$f_{x2} = \frac{-y_{o2}}{A_o}, \text{ and}$$

$$f_{y2} = \frac{x_{o2}}{A_o} + \varepsilon \frac{y_{o2}}{A_o},$$

where ($\varepsilon$) is the selected shearing value (s), $A_o$ is an area of a halftone cell, and ($x_o$, $y_o$) is a nominal coordinate corresponding to the output location of the at least one sheared vector.

3. The method of claim 1, wherein the at least one shearing value (s) is a line-to-line offset in the start-of-scan signal for a raster line, further comprising linearly increasing the shearing value (s) responsive to a change in the raster line.

4. The method of claim 1, wherein the at least one shearing value (s) is an angular offset of at least one of the first fundamental frequency vector ($V_1$) and the second fundamental frequency vector ($V_2$).

5. The method of claim 1, wherein the at least one shearing value (s) is a periodic offset in the start-of-scan signal for a raster line, and wherein the periodic offset is generated responsive to alternating between two or more phases of an associated pixel clock.

6. The method of claim 1, wherein selecting a shearing value (s) further comprises determining a shearing offset value ($\epsilon_x$) in an x-direction and a shearing offset value ($\epsilon_y$) in a y-direction, and wherein the shearing comprises applying the offset ($\epsilon_x$) in the x-direction and applying the offset ($\epsilon_y$) in the y-direction to at least one of $V_1$ and $V_2$.

7. The method of claim 2, wherein the first fundamental frequency vector ($V_1$) is defined as ($V_{c1}$) and the second fundamental frequency vector ($V_2$) is defined as ($V_{c2}$), further comprising:
 identifying a second color halftone screen having halftone cells defined by a first fundamental frequency vector ($V_{m1}$) and a second fundamental frequency vector ($V_{m2}$);
 identifying a third color halftone screen having halftone cells defined by a first fundamental frequency vector ($V_{k1}$) and a second fundamental frequency vector ($V_{k2}$);
 selecting a shearing value ($\epsilon_m$) representative of an offset in at least one of a fast scan direction and a slow scan direction corresponding to the second color halftone screen, and a shearing value ($\epsilon_k$) corresponding to the third color halftone screen;
 shearing at least one of the first fundamental frequency vector ($V_{m1}$) and the second fundamental frequency vector ($V_{m2}$) for the second halftone screen by application of the shearing value ($\epsilon_m$) associated therewith, so as to generate a second sheared color halftone screen for avoiding moiré image effects;
 shearing at least one of the first fundamental frequency vector ($V_{k1}$) and the second fundamental frequency vector ($V_{k2}$) for the third halftone screen by application of the shearing value ($\epsilon_k$) associated therewith, so as to generate a third sheared color halftone screen for avoiding moiré image effects; and
 outputting a set of sheared color halftone screens comprising the first, second, and third sheared color halftone screens.

8. The method of claim 7, wherein selecting the shearing values ($\epsilon_c$, $\epsilon_m$, $\epsilon_k$) comprises satisfying the following:

$$\frac{x_{co1}}{A_{co}} + \frac{x_{mo1}}{A_{mo}} + \frac{x_{ok1}}{A_{ko}} + \frac{\epsilon_c y_{co1}}{A_{co}} + \frac{\epsilon_m y_{mo1}}{A_{mo}} + \frac{\epsilon_k y_{ok1}}{A_{ko}} = 0,$$

$$\frac{y_{co1}}{A_{co}} + \frac{y_{mo1}}{A_{mo}} + \frac{y_{ko1}}{A_{ko}} = 0,$$

$$\frac{x_{co2}}{A_{co}} + \frac{x_{mo2}}{A_{mo}} + \frac{x_{ok2}}{A_{ko}} + \frac{\epsilon_c y_{co2}}{A_{co}} + \frac{\epsilon_m y_{mo2}}{A_{mo}} + \frac{\epsilon_k y_{ok2}}{A_{ko}} = 0, \text{ and}$$

$$\frac{y_{co2}}{A_{co}} + \frac{y_{mo2}}{A_{mo}} + \frac{y_{ko2}}{A_{ko}} = 0,$$

where A represents an area of a halftone cell associated with the identified halftone screen, and ($x_o$, $y_o$) is a nominal coordinate corresponding to the output location of the at least one sheared vector.

9. A computer-implemented method for generating a set of sheared color halftone screens for moiré-free color halftoning, comprising:
 identifying a first color halftone screen having halftone cells defined by a first fundamental frequency vector ($V_{c1}$) and a second fundamental frequency vector ($V_{c2}$), a second color halftone screen defined by a first fundamental frequency vector ($V_{m1}$) and a second fundamental frequency vector ($V_{m2}$), and a third color halftone screen defined by a first fundamental vector ($V_{k1}$) and a second fundamental frequency vector ($V_{k2}$);
 selecting a shearing value ($s_c$, $s_m$, $s_k$) corresponding to an offset in at least one of a fast scan direction and a slow scan direction for each of the first, second, and third color halftone screens;
 shearing at least one of the first fundamental frequency vectors ($V_{c1}$, $V_{m1}$, $V_{k1}$) and the second fundamental frequency vectors ($V_{c2}$, $V_{m2}$, $V_{k2}$) for each of the first, second, and third halftone screens by application of the shearing values ($s_c$, $s_m$, $s_k$) corresponding thereto;
 generating a set of sheared color halftone screens in accordance with at least one of the sheared first fundamental frequency vectors ($V_{c1}$, $V_{m1}$, $V_{k1}$) and the second fundamental frequency vectors ($V_{c2}$, $V_{m2}$, $V_{k2}$) so as to avoid moiré image effects; and
 outputting the set of sheared color halftone screens.

10. The method of claim 9, wherein the shearing values ($s_c$, $s_m$, $s_k$) are at least one of:
 a line-to-line offset in the start-of-scan signal for a raster line,
 an angular offset of at least one of the first fundamental frequency vectors ($V_{c1}$, $V_{m1}$, $V_{k1}$) and the second fundamental frequency vectors ($V_{c2}$, $V_{m2}$, $V_{k2}$), and
 a periodic offset in the start-of-scan signal for a raster line that is generated responsive to alternating between two or more phases of an associated pixel clock.

11. The method of claim 9, wherein selecting the shearing values ($s_c$, $s_m$, $s_k$) further comprises determining a respective shearing offset value ($\epsilon_{cx}$, $\epsilon_{mx}$, $\epsilon_{kx}$) in an x-direction and a respective shearing offset value ($\epsilon_{cy}$, $\epsilon_{my}$, $\epsilon_{ky}$) in a y-direction, and wherein the shearing comprises applying the shearing offset values ($\epsilon_{cy}$, $\epsilon_{my}$, $\epsilon_{ky}$) in the x-direction and applying the shearing offset values ($\epsilon_{cy}$, $\epsilon_{my}$, $\epsilon_{ky}$) in the y-direction to a corresponding at least one of the first fundamental frequency vectors ($V_{c1}$, $V_{m1}$, $V_{k1}$) and the second fundamental frequency vectors ($V_{c2}$, $V_{m2}$, $V_{k2}$) for each of the first, second, and third halftone screens.

12. The method of claim 9, wherein selecting a shearing value ($s_c$, $s_m$, $s_k$) comprises satisfying the following:

$$\frac{x_{co1}}{A_{co}} + \frac{x_{mo1}}{A_{mo}} + \frac{x_{ok1}}{A_{ko}} + \frac{\epsilon_c y_{co1}}{A_{co}} + \frac{\epsilon_m y_{mo1}}{A_{mo}} + \frac{\epsilon_k y_{ok1}}{A_{ko}} = 0,$$

$$\frac{y_{co1}}{A_{co}} + \frac{y_{mo1}}{A_{mo}} + \frac{y_{ko1}}{A_{ko}} = 0,$$

$$\frac{x_{co2}}{A_{co}} + \frac{x_{mo2}}{A_{mo}} + \frac{x_{ok2}}{A_{ko}} + \frac{\epsilon_c y_{co2}}{A_{co}} + \frac{\epsilon_m y_{mo2}}{A_{mo}} + \frac{\epsilon_k y_{ok2}}{A_{ko}} = 0, \text{ and}$$

$$\frac{y_{co2}}{A_{co}} + \frac{y_{mo2}}{A_{mo}} + \frac{y_{ko2}}{A_{ko}} = 0,$$

where ($\epsilon_c$, $\epsilon_m$, $\epsilon_k$) represent the selected shearing values ($s_c$, $s_m$, $s_k$), A represents an area of a halftone cell associated with the identified halftone screen, and ($x_o$, $y_o$) is a nominal coordinate corresponding to the output location of the at least one sheared vector.

13. The method of claim 11, wherein selecting an offset value ($\epsilon_{cx}$, $\epsilon_{mx}$, $\epsilon_{kx}$, $\epsilon_{cy}$, $\epsilon_{my}$, $\epsilon_{ky}$) comprises satisfying the following:

$$\frac{x_{co1}}{A_{co}} + \frac{x_{mo1}}{A_{mo}} + \frac{x_{ok1}}{A_{ko}} + \frac{\epsilon_{xc} y_{co1}}{A_{co}} + \frac{\epsilon_{xm} y_{mo1}}{A_{mo}} + \frac{\epsilon_{xk} y_{ok1}}{A_{ko}} = 0,$$

$$\frac{y_{co1}}{A_{co}} + \frac{y_{mo1}}{A_{mo}} + \frac{y_{ko1}}{A_{ko}} + \frac{\epsilon_{yc} x_{co1}}{A_{co}} + \frac{\epsilon_{ym} x_{mo1}}{A_{mo}} +$$

$$\frac{\epsilon_{yk} x_{ko1}}{A_{ko}} + \frac{\epsilon_{xc}\epsilon_{yc} y_{co1}}{A_{co}} + \frac{\epsilon_{xm}\epsilon_{ym} y_{mo1}}{A_{mo}} + \frac{\epsilon_{xk}\epsilon_{ym} y_{ko1}}{A_{ko}} = 0,$$

-continued $$\frac{x_{co2}}{A_{co}} + \frac{x_{mo2}}{A_{mo}} + \frac{x_{ok2}}{A_{ko}} + \frac{\varepsilon_{xc}y_{co2}}{A_{co}} + \frac{\varepsilon_{xm}y_{mo2}}{A_{mo}} + \frac{\varepsilon_{xk}y_{ok2}}{A_{ko}} = 0, \text{ and}$$

$$\frac{y_{co2}}{A_{co}} + \frac{y_{mo2}}{A_{mo}} + \frac{y_{ko2}}{A_{ko}} + \frac{\varepsilon_{yc}x_{co2}}{A_{co}} + \frac{\varepsilon_{ym}x_{mo2}}{A_{mo}} +$$

$$\frac{\varepsilon_{yk}x_{ok2}}{A_{ko}} + \frac{\varepsilon_{xc}\varepsilon_{yc}y_{co2}}{A_{co}} + \frac{\varepsilon_{xm}\varepsilon_{ym}y_{mo2}}{A_{mo}} + \frac{\varepsilon_{xk}\varepsilon_{ym}y_{ok2}}{A_{ko}} = 0,$$

where A represents an area of a halftone cell associated with the identified halftone screen, and ($x_o$, $y_o$) is a nominal coordinate corresponding to the output location of the at least one sheared vector.

14. A system that facilitates generating halftone screens for moiré-free color halftoning, comprising:
   a processor operable to:
   identify a first color halftone screen having halftone cells defined by a first fundamental frequency vector ($V_1$) and a second fundamental frequency vector ($V_2$),
   select at least one shearing value (s) representative of an offset in at least one of a fast scan direction and a slow scan direction, and
   shear at least one of the first fundamental frequency vector ($V_1$) and the second fundamental frequency vector ($V_2$) for the first halftone screen by application of the shearing value (s) associated therewith,
   generate a first sheared color halftone screen in accordance with at least one of the sheared first fundamental frequency vector ($V_1$) and the second fundamental frequency vector ($V_2$) so as to avoid moiré image effects; and
   a printer that prints a halftone image using the first sheared color halftone screen.

15. The system of claim 14, wherein the sheared first fundamental frequency vector $V_1(f_{x1},f_{y1})$ and the sheared second fundamental frequency vector $V_2(f_{x2},f_{y2})$ are expressed as:

$$f_{x1} = \frac{-y_{o1}}{A_o},$$

$$f_{y1} = \frac{x_{o1}}{A_o} + \varepsilon\frac{y_{o1}}{A_o},$$

$$f_{x2} = \frac{-y_{o2}}{A_o}, \text{ and}$$

$$f_{y2} = \frac{x_{o2}}{A_o} + \varepsilon\frac{y_{o2}}{A_o},$$

where ($\varepsilon$) is the selected shearing value (s), $A_o$ is an area of a halftone cell, and ($x_o$, $y_o$) is a nominal coordinate corresponding to the output location of the at least one sheared vector.

16. The system of claim 14, wherein the at least one shearing value (s) is at least one of:
   a line-to-line offset in the start-of-scan signal for a raster line, and
   an angular offset of at least one of the first fundamental frequency vector ($V_1$) and the second fundamental frequency vector ($V_2$).

17. The system of claim 14, wherein the at least one shearing value (s) is a periodic offset in the start-of-scan signal for a raster line that is generated responsive to alternating between two or more phases of an associated pixel clock.

18. The system of claim 14, wherein selecting a shearing value (s) further comprises determining a shearing offset value ($\varepsilon_x$) in an x-direction and a shearing offset value ($\varepsilon_y$) in a y-direction, and wherein the shearing comprises applying the offset ($\varepsilon_x$) in the x-direction and applying the offset ($\varepsilon_y$) in the y-direction to at least one of $V_1$ and $V_2$.

19. The system of claim 15, wherein the first fundamental frequency vector ($V_1$) is defined as ($V_{c1}$) and the second fundamental frequency vector ($V_2$) is defined as ($V_{c2}$), the processor further operable to:
   identify a second color halftone screen having non-orthogonal halftone cells defined by a first fundamental frequency vector ($V_{m1}$) and a second fundamental frequency vector ($V_{m2}$);
   identify a third color halftone screen having non-orthogonal halftone cells defined by a first fundamental frequency vector ($V_{k1}$) and a second fundamental frequency vector ($V_{k2}$);
   select a shearing value ($\varepsilon_m$) representative of an offset in at least one of a fast scan direction and a slow scan direction corresponding to the second color halftone screen, and a shearing value ($\varepsilon_k$) corresponding to the third color halftone screen;
   shear at least one of the first fundamental frequency vector ($V_{m1}$) and the second fundamental frequency vector ($V_{m2}$) for the second halftone screen by application of the shearing value ($\varepsilon_m$) associated therewith, so as to generate a second sheared color halftone screen for avoiding moiré image effects;
   shear at least one of the first fundamental frequency vector ($V_{k1}$) and the second fundamental frequency vector ($V_{k2}$) for the third halftone screen by application of the shearing value ($\varepsilon_k$) associated therewith, so as to generate a third sheared color halftone screen for avoiding moiré image effects; and
   output a set of sheared color halftone screens comprising the first, second, and third sheared color halftone screens.

20. The system of claim 19, wherein selecting the shearing values ($s_c$, $s_m$, $s_k$) comprises satisfying the following:

$$\frac{x_{co1}}{A_{co}} + \frac{x_{mo1}}{A_{mo}} + \frac{x_{ok1}}{A_{ko}} + \frac{\varepsilon_c y_{co1}}{A_{co}} + \frac{\varepsilon_m y_{mo1}}{A_{mo}} + \frac{\varepsilon_k y_{ok1}}{A_{ko}} = 0,$$

$$\frac{y_{co1}}{A_{co}} + \frac{y_{mo1}}{A_{mo}} + \frac{y_{ko1}}{A_{ko}} = 0,$$

$$\frac{x_{co2}}{A_{co}} + \frac{x_{mo2}}{A_{mo}} + \frac{x_{ok2}}{A_{ko}} + \frac{\varepsilon_c y_{co2}}{A_{co}} + \frac{\varepsilon_m y_{mo2}}{A_{mo}} + \frac{\varepsilon_k y_{ok2}}{A_{ko}} = 0, \text{ and}$$

$$\frac{y_{co2}}{A_{co}} + \frac{y_{mo2}}{A_{mo}} + \frac{y_{ko2}}{A_{ko}} = 0,$$

where ($\varepsilon_c$, $\varepsilon_m$, $\varepsilon_k$) represent selected shearing values ($s_c$, $s_m$, $s_k$), A represents an area of a halftone cell associated with the identified halftone screen, and ($x_o$, $y_o$) is a nominal coordinate corresponding to the output location of the at least one sheared vector.

* * * * *